(12) United States Patent
Aslan

(10) Patent No.: US 6,480,127 B1
(45) Date of Patent: Nov. 12, 2002

(54) INPUT SUB-RANGING CONVERTER SYSTEM FOR SAMPLING SEMICONDUCTOR TEMPERATURE SENSORS

(75) Inventor: Mehmet Aslan, Milpitas, CA (US)

(73) Assignee: National Semiconductor Corporation, Santa Clara, CA (US)

(*) Notice: Subject to any disclaimer, the term of this patent is extended or adjusted under 35 U.S.C. 154(b) by 0 days.

(21) Appl. No.: 10/051,349

(22) Filed: Jan. 16, 2002

Related U.S. Application Data

(60) Provisional application No. 60/325,943, filed on Sep. 27, 2001.

(51) Int. Cl.[7] .................................................. H03M 1/06
(52) U.S. Cl. ..................... 341/119; 341/118; 341/120; 341/136; 374/178; 374/183; 257/467; 438/237
(58) Field of Search ................................. 341/118, 119, 341/120, 136

(56) References Cited

U.S. PATENT DOCUMENTS

| | | | |
|---|---|---|---|
| 5,100,829 A | * 3/1992 | Fay et al. .................... | 438/237 |
| 5,349,336 A | * 9/1994 | Nishiura et al. ............ | 374/152 |
| 5,401,099 A | * 3/1995 | Nishizawa et al. ......... | 374/178 |
| 5,876,122 A | * 3/1999 | Eryurek ....................... | 374/183 |
| 6,149,299 A | 11/2000 | Aslan et al. ................ | 374/178 |
| 6,332,710 B1 | 12/2001 | Aslan et al. ................ | 374/183 |

OTHER PUBLICATIONS

"8–Lead, Low–Cost, System Temperature Monitor ADM1020," Analog Devices, Inc., 1999, pp. 5–6.
"Low–Cost Microprocessor System Temperature Monitor ADM1021A," Analog Devices, Inc., 2001, pp. 5–7.
"System Monitor and Fan Controller For Low–Noise PCs ADM1027," Analog Devices, Inc., 2001, pp. 14–17.

(List continued on next page.)

*Primary Examiner*—Michael Tokar
*Assistant Examiner*—Lam T. Mai
(74) *Attorney, Agent, or Firm*—Mark R. Hennings; Merchant & Gould

(57) ABSTRACT

A converter system for a temperature sensor includes a programmable current source, a digital-to-analog converter, a summer, and an analog-to-digital converter. The temperature sensor provides a measurement voltage in response to application of a bias current. The programmable current source selectively provides two different currents to the temperature sensor such that the temperature sensor provides two measurement voltages during a given temperature measurement. The digital-to-analog converter (DAC) provides an intermediate voltage that corresponds to an approximation of a voltage between the two voltages. A summer is configured to produce an offset measurement in response to the intermediate voltage and the measurement voltage. The analog-to-digital converter (ADC) receives the offset measurement voltage and produces a conversion code. Offsetting the measurement voltage reduces the dynamic range requirements of the ADC such that substantially a full input range of the ADC is utilized.

22 Claims, 9 Drawing Sheets

OTHER PUBLICATIONS

"±1° C. Remote and Local System Temperature Monitor ADM1032," Analog Devices, Inc., 2001, p. 5.

"Remote/Local Temperature Sensor with SMBus Serial Interface MAX1617," Maxim Integrated Products, Rev 1; 3/98, pp. 6–9.

"Remote/Local Temperature Sensor with SMBus Serial Interface MAX1617A," Maxim Integrated Products, Rev 0; 1/99, pp. 6–9.

"MIC184 Local/Remote Thermal Supervisor," Micrel, Inc., Nov. 2000, pp. 6–7.

"LM83 Triple–Diode Input and Local Digital Temperature Sensor with Two–Wire Interface," National Semiconductor Corporation, Nov., 1999, pp. 8 and 17.

"LM84 Diode Input Digital Temperature Sensor with Two–Wire Interface," National Semiconductor Corporation, Jul. 2000, pp. 9–10, 14–15.

"LM88 Factory Programmable Dual Remote–Diode Thermostat, " National Semiconductor Corporation, Aug. 2001, 9 pgs.

"LM87 Serial Interface System Hardware Monitor with Remote Diode Temperature Sensing," National Semiconductor Corporation, Nov. 2001, pp. 8, 17–18.

"LM86±1° C Accurate, Remote Diode and Local Digital Temperature Sensor with Two–Wire Interface," National Semiconductor Corporation, Feb. 2002, pp. 7, 11–12, 17–19.

"LM90±3° C Accurate, Remote Diode and Local Digital Temperature Sensor with Two–Wire Interface," National Semiconductor Corporation, Feb. 2002, pp. 7, 11–12, 17–19.

"NE1617A Temperature Monitor for Microprocessor Systems," Philips Semiconductors, Dec. 14, 2001, p. 9.

"Environmental Monitoring and Control Device with Automatic Fan Capability EMC6D100, EMC6D101," Standard Microsystems Corporation, Rev. Nov. 19, 2001, pp. 22–23.

"THMC50 Remote/Local Temperature Monitor and Fan Controller with SMBus Interface," Texas Instruments Incorporated, 1999, pp. 2, 17–18.

"THMC10 Remote/Local Temperature Monitor with SMBus Interface," Texas Instruments Incorporated, 1999, pp. 13–14.

A. Bakker and J.H. Huijsing, "High Accuracy CMOS Smart Temperature Sensors," *Kluwer Academic Publishers*, pp. 9–34, 74–77,106–116, 2000.

* cited by examiner

US 6,480,127 B1

INPUT SUB-RANGING CONVERTER SYSTEM FOR SAMPLING SEMICONDUCTOR TEMPERATURE SENSORS

RELATED APPLICATION

This utility patent application claims the benefit under 35 United States Code §119(e) of United States Provisional Patent Application No. 60/325,943 filed on Sep. 27, 2001.

FIELD OF THE INVENTION

The present invention relates to a method and apparatus for electronic temperature sensing and recording. More specifically, the present invention is directed to reducing the dynamic range required for an analog-to-digital converter that is used to measure the effects of temperature changes upon a forward-biased PN junction of a temperature sensor where two current levels are used to bias the PN junction.

BACKGROUND OF THE INVENTION

Temperature sensors are often employed to measure temperatures in a remote system. One type of temperature sensor includes a semiconductor device such as a PN junction. A PN junction conducts a current when forward biased. The PN junction has an associated voltage drop that is determined by the forward bias current and the temperature of the PN junction. Voltage drops across the PN junction are measured for two different forward bias currents. An analog-to-digital converter (ADC) may be employed to convert the voltage drops across the PN junction to digital data. The digital data is recorded and analyzed to determine the temperature of the PN junction.

SUMMARY OF THE INVENTION

The present invention is directed to a method and apparatus for electronic temperature sensing. More specifically the present invention is directed towards a method and apparatus that reduces the dynamic range required by an analog-to-digital converter (ADC).

In one example, a converter system for a temperature sensor includes a programmable current source, a digital-to-analog converter, a summer, and an analog-to-digital converter. The temperature sensor provides a measurement voltage in response to application of a bias current. The programmable current source selectively provides two different currents to the temperature sensor such that the temperature sensor provides two measurement voltages during a given temperature measurement. The digital-to-analog converter (DAC) provides an intermediate voltage that corresponds to an approximation of a voltage between the two voltages. A summer is configured to produce an offset measurement in response to the intermediate voltage and the measurement voltage. The analog-to-digital converter (ADC) receives the offset measurement voltage and produces a conversion code. Offsetting the measurement voltage reduces the dynamic range requirements of the ADC such that substantially a full input range of the ADC is utilized.

DETAILED DESCRIPTION OF THE PREFERRED EMBODIMENT

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on".

The present invention is directed to a method and apparatus that reduces the dynamic range requirements for an analog-to-digital converter (ADC) that is used in a temperature measurement system that employs a temperature sensor. The temperature sensor provides a voltage in response to application of a bias current. A temperature measurement is made by sampling the voltages provided by the temperature sensor under different bias conditions and calculating the temperature based on the sampled voltages. The required dynamic range requirements of the ADC are reduced by offsetting the voltages from the temperature sensor such that a substantially constant conversion range is utilized. The reduced input voltage range allows the ADC to operate without a loss in measurement accuracy. The reduction in the dynamic range of the ADC advantageously results in a reduced size and complexity of the ADC.

A data-acquisition system is used to monitor the temperature of a sensor on a remote system. The data-acquisition system monitors the temperature by measuring the difference between response voltages that result from two applied currents across the sensor. The differences in the voltages ($\Delta V_{for}$) that result from the two applied currents occur due to changes in temperature of the PN junction and thus allow the temperature to be calculated. An intermediate voltage (or "offset voltage") that corresponds to an approximation of a voltage that is between the response voltages is used to offset each response voltage from the sensor. The offset response voltages maintain the same difference ($\Delta V_{for}$) between each offset voltage. However, the offset response voltages are lower voltages than the original response voltages. Accordingly, an ADC having a reduced input voltage range can be used to obtain samples from the PN junction.

Figure 1:
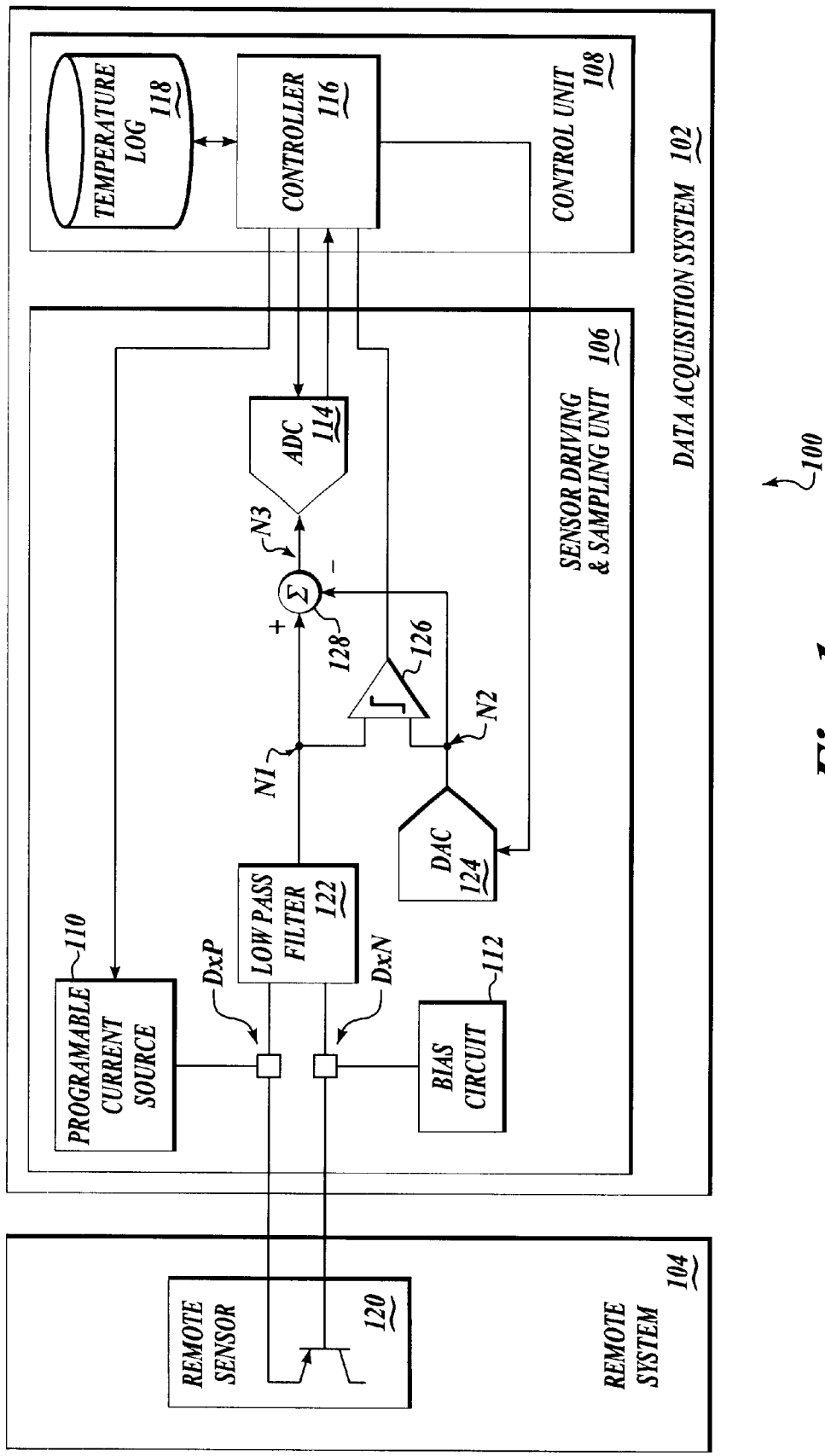
FIG. 1 is a schematic block diagram of an example time-interleaved sampling temperature measurement system in accordance with the present invention.

FIG. 1 is a schematic block diagram of an example temperature measurement system that uses an input sub-ranging converter in accordance with the present invention. The temperature measurement system (100) includes a data acquisition system (102) and a remote system (104). The remote system (104) may be located on the same substrate, or a different substrate, as the substrate containing the data acquisition system (102). The data acquisition system (102) includes a sensor driving and sampling unit (106) and a control unit (108). The sensor driving and sampling unit (106) includes a programmable current source (110), a bias circuit (112), an analog-to-digital converter (114), an optional low pass filter (122), a digital-to-analog converter (DAC, 124), a comparator (126), and a summer (128). The control unit (108) includes a controller (116) and an optional temperature log (118). The remote system (104) includes a remote sensor (120).

The remote sensor (120) is illustrated as a PNP transistor that has an emitter that is coupled to node DxP and a base that is coupled to node DxN. The programmable current source (110) includes an output that is coupled to node DxP and an input that is coupled to the controller (116). The bias circuit (112) is coupled to node DxN. The optional low pass filter (122) includes a differential input that is coupled to node DxP and node DxN, and an output that is coupled to node N1. The DAC (124) has an input that is coupled to the controller (116) and an output that is coupled to node N2. The comparator (126) includes inputs that are coupled to nodes N1 and N2, and an output that is coupled to the controller (116). The summer (128) has a differential input that is connected to the nodes N1 and N2, and an output that is coupled to node N3. The ADC (114) has a first input that is coupled to node N3, a second input that is coupled to the controller (116), and an output that is coupled to the controller (116). The controller (116) is also coupled to the optional temperature log (118).

The sensor driving and sampling unit (106) of the present invention uses a sub-ranging technique to reduce the dynamic range that is required by the ADC (114). The DAC (124) provides an intermediary voltage to the summer (128) as will be described in further detail below. The summer (128) provides an offset response voltage to the ADC (114). The ADC (114) is utilized to capture the response voltages from the remote sensor (120) such that the temperature of the remote sensor (120) may be calculated from the difference ($\Delta V_{for}$) between the response voltages. For example, $\Delta V_{for}$ is expected to be around 100 mV when the full-scale value of the response voltages is around 1.2 volts. By offsetting the response voltage from the remote sensor, the conversion resolution of the ADC (114) may be increased while the dynamic range of the ADC (114) is decreased. The size and complexity of the ADC (114) are reduced despite the conversion resolution increases.

An intermediate voltage is selected by offsetting the response voltage from the remote sensor (120). The controller (116) directs the programmable current source (110) to apply two currents to the remote sensor (120) such that the remote sensor produces response voltages. Typically the larger of two currents is applied first, although in alternate embodiments the smaller of two currents may be applied first. The DAC (124), the comparator (126), and the controller (116) operate together as an analog-to-digital converter that receives the response voltages from the remote sensor (120) and measures the response voltages. The analog-to-digital conversion can be accomplished using a successive approximation algorithm, up-down counting, and the like. Alternatively, the ADC (114) can be used in place of the comparator (126) by determining when, and by how much the output of the summation node (128) falls within the range of the ADC (114).

After the response voltages from the remote sensor (120) have been measured, the output of the DAC (124) is adjusted to provide an intermediate voltage. The intermediate voltage is between the response voltages from the remote sensor (120) due to the application of the larger and smaller currents. The output of the DAC (124) can be adjusted up or down, or passive or active circuitry engaged to provide the required adjustment. The summer (128) subtracts the intermediate voltage from the response voltages to provide offset response voltages to the ADC (114). The offset response voltages have a reduced voltage level compared to the response voltages. The intermediate voltage can be reselected as often as is necessary to maintain the $\Delta V_{for}$ within the range of the ADC (114) as the temperature of the remote sensor (120) varies. An example adjustment to the intermediate voltage is described below.

A larger current is first applied to the remote sensor (120) such that the remote sensor (120) produces a response voltage. Digital codes are iteratively supplied to the DAC (124) such that the DAC (124) produces DAC voltages. The DAC voltages are compared to the response voltage by the comparator (126). When the output of the comparator indicates a successful conversion of the response voltage, the current digital code is decremented by one and provided to the DAC as the correct offset code.

It is expected that remote sensor (120) will respond to a smaller current with a response voltage that is up to 100 mV less than the voltage response from the larger current. In one example, a 5-bit DAC is used to resolve voltages within a range of 1.2 volts to a resolution of 37.5 mV (i.e., the value of the least significant bit (LSB) of the DAC, or "quantization level"). The digital code that produces a voltage that is one LSB less than the response voltage for the larger current will correspond to a voltage that is within 37.5 mV of the response voltage. On average, the greatest digital code is expected to be within 37.5 mV of the present voltage response (0–1 LSB). Thus, the digital conversion code for the larger current response voltage is decremented by one to provide an intermediate voltage (or "voltage offset"). Accordingly, the offset voltage of this example will be within 6.25 mV of the center of the expected voltage responses of the remote sensor (120) to the applied larger and smaller currents.

Figure 2:
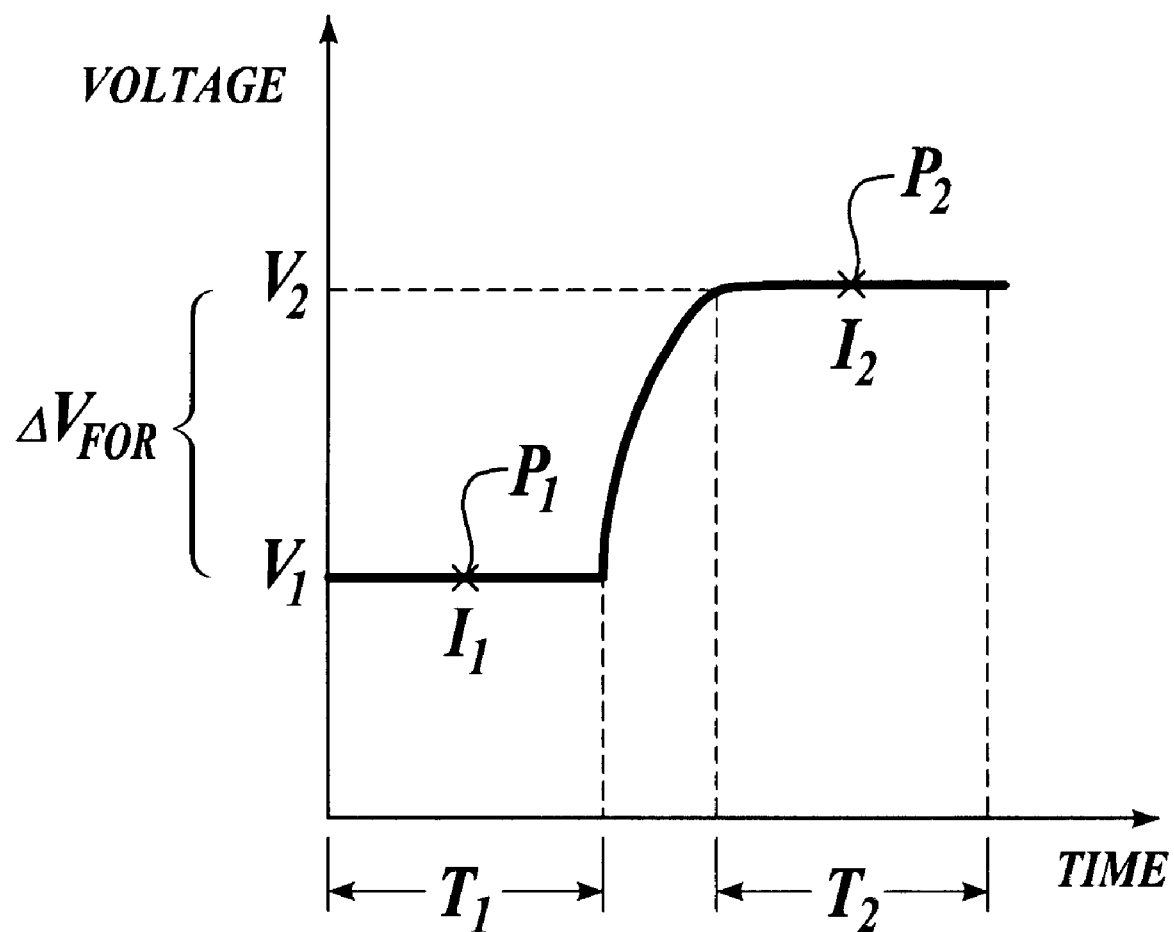
FIG. 2 is a graph illustrating various bias currents being used to measure a rising temperature in accordance with the present invention.

FIG. 2 is a graph illustrating the application of two bias currents to the sensor in accordance with the present invention. As shown in FIG. 2, a first bias current (I1) is applied to the remote sensor in a first time interval (T1) to produce a first responsive voltage (V1). A second bias current (I2) is applied to the remote sensor during a second time interval (T2) to produce a second responsive voltage (V2). The difference between the first and second voltages corresponds to $\Delta V_{for}$. The first and second bias currents are related to one another as a ratio. In one example, the ratio of the currents is ten-to-one. In another example, the ratio of the currents is sixteen-to-one.

Temperature measurements of a PN junction in the remote sensor (120) are measured by applying currents, measuring resulting voltages, and calculating a temperature based on the resulting voltages. The programmable current source (110) provides two currents to the PN junction. The currents are applied so that the PN junction in the remote sensor (120) is forward-biased. The resulting voltages across the PN junction from each applied current is sampled with the ADC (114).

In an alternate embodiment, the voltage across the PN junction in the remote sensor (120) may be over-sampled (such that many samples are taken for a selected bias current). The samples may be averaged to reduce the effects of noise and to enhance the accuracy of calculations using values derived by the analog-to-digital conversions. Samples are typically made at regular intervals such that each sample is separated from other samples by substantially equal time differences. Substantially equal time differences are within 90 percent of a desired value.

Temperature calculations can be determined according to the following formula:

$$T = \frac{q \Delta V_{for}}{\eta K \ln(N)}, \quad (I)$$

where

T=absolute temperature in degrees Kelvin;
q=the charge on the carrier (electron charge);
$\Delta V_{for}$=change in the forward-biased voltage;
K=Boltzmann's constant;
N=ratio of the two applied currents; and
η=ideality factor of the diode.

The ratio (N) can be realized as a combination of area ratios of the PN junctions using a common current, a ratio of currents across two PN junctions that have the same area, or a combination thereof. In the case where the PN junctions have the same area, the change in the forward-biased diode voltage ($\Delta V_{for}$) can be determined by subtracting the measured voltages that resulted by applying two different currents. The two PN junctions ideally should have the same PN junction temperature despite the fact that they cannot exist in the exact same physical location.

Similarly, a value for the ratio (N) can be achieved when only using one PN junction. (The one PN junction may include "stacked diodes" or PN junctions in parallel.) To achieve a value for the ratio (N) when using only one PN junction, two different currents can be successively applied to the one PN junction. Keeping the time between applications of the successive currents relatively small can reduce the magnitude of errors due to temperature drift of the one PN junction.

Figure 3:
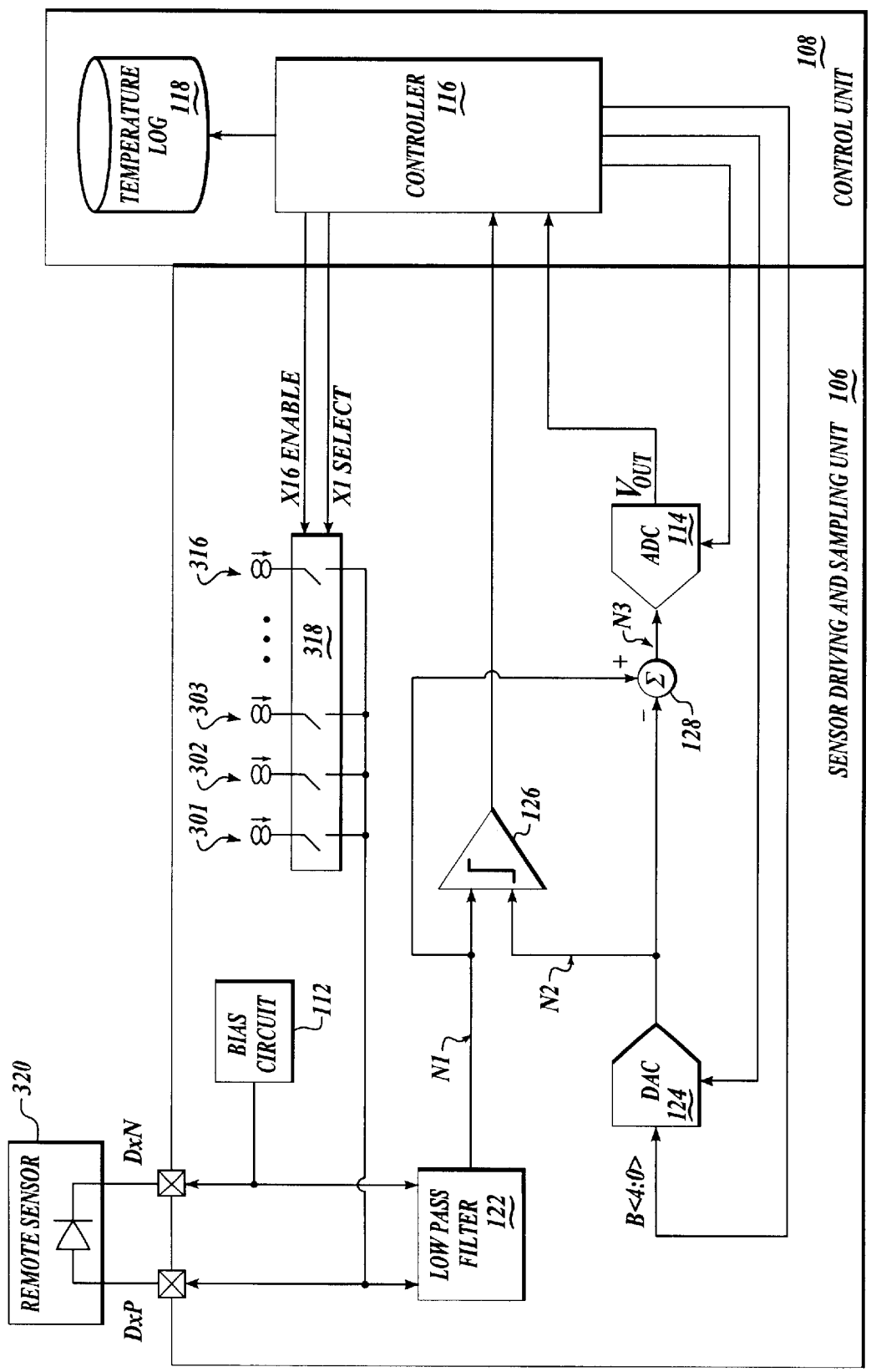
FIG. 3 is a schematic diagram of an example sensor driving and sampling unit in accordance with the present invention.

FIG. 3 is a schematic diagram of temperature measurement system (100) that is in accordance with the present invention. A sensor driving and sampling unit (106) contains an array of 16 current sources (301–316), a switch array (318), an ADC (114), a DAC (124), a comparator (126), an optional low pass filter (122), a summer (128), a bias circuit (112), and a remote sensor (320). A control unit (108) contains a controller (116) and an optional temperature log (118). Identical components from FIG. 2 are labeled and connected identically in FIG. 3. The bias circuit (112) is identical to that previously discussed. The discussion concerning the remote sensor diode (320) is identical to the discussion of the remote sensor (320) with the exception that the remote sensor is represented as a diode.

The switch array (318) is coupled between the outputs of the current sources (301–316) and node DxP. Signal X16Enable and signal X1Select are provided by the controller (116) to control the switch array (318). The ADC (114) provides a signal bus output $V_{OUT}$ in response to a common mode input signal $V_{CM}$ (not shown), a full-scale input signal $V_{FS}$ (not shown), and a signal bus Control Logic input from the controller (116).

The switch array (318) provides at least two levels of current by selectively coupling one or more current sources (301–316) to the node DxP. A current density ratio of 16 to 1 is provided by selectively switching on one or all 16 current sources (301–316) when the current sources (301–316) each have equal current densities. Also, individual current sources may be activated at different times such that a desired programmable current level may be realized by selectively activating different current sources. For example, each equally sized current source can be activated sequentially for remote sensor (320) measurements such that the same current density is provided from differing current sources. The current sources may be sized differently such that integer and noninteger current ratios of greater than one can be achieved.

In operation, the controller (116) provides the signals X16Enable and X1Select to program the switch array (318). The controller (116) may be implemented as a microprocessor, a microcontroller, hardwired logic, a state machine, and the like. Mathematic functions provided by controller (116) may be implemented as algorithms embodied in software or firmware, implemented using physical devices, or implemented as a combination of both. For example, a function for averaging may be implemented as an average calculator. An average calculator uses an adder to find the sum of input digits and then uses a divider to divide the sum by the number of input digits.

The switch array (318) is selectively activated to provide a 1X current density or a 16X current density. Activating signal X1Select causes one of the current sources (at a 1X current density) to be applied to the remote sensor diode (120), while activating X16Enable causes all of the current sources (notwithstanding the state of the signal X1Select) to be applied to the remote sensor (320). The applied current and the voltage applied to the remote sensor (320) by the bias circuit (112) cause a voltage to develop across the PN junction in the remote sensor diode (120). The bias circuit (112) acts to establish node DxN to a known potential. In one example, node DxN is connected to ground. In another example, node DxN is connected to a defined reference potential that is provided by the bias circuit (112). The response voltage from the remote sensor (320) is dependent upon the temperature of the PN junction in the remote sensor diode (120), the bias voltage applied to node DxN, and the applied bias current.

The controller (116) activates X16Enable to apply to a higher-level current to the remote sensor diode (120) in preparation for determining an intermediate voltage. The low pass filter (122) is configured to remove system noise on the signal from the remote sensor diode (120) and convert differentials signal from the remote sensor diode (120) to a single voltage that is referenced to ground. Alternatively, another circuit (not shown) may be employed to convert the differential signal to a single supply referenced (single-ended) signal.

The controller (116) initiates a voltage measurement of the remote sensor diode (120) by signaling the ADC (114) using the signal bus Control Logic. The ADC (114) may be implemented by any type of converter (e.g. flash, successive approximation, and the like) that is capable of performing an analog-to-to digital conversion within a required time interval. An optional low pass filter (122) may be used at the input of the ADC (114) to reduce system noise. Undesirable noise may be induced upon the voltage from the PN junction in the remote sensor diode (120) by unstable power rails, inductive coupling, and the like. Where the system noise is low, a sample and hold device may not be necessary at the input of the ADC (114) because the temperature (and the signal that conveys the temperature) typically will not vary rapidly with respect to the sampling rate. A wide range of implementations of the control logic will be suitable. The controller (116) retrieves the voltage measurement from the ADC (114) by reading the signal bus ($V_{OUT}$). Signals $V_{CM}$ and $V_{FS}$ are a common-mode voltage and a full-scale voltage that are applied to the ADC (114).

Figure 4:
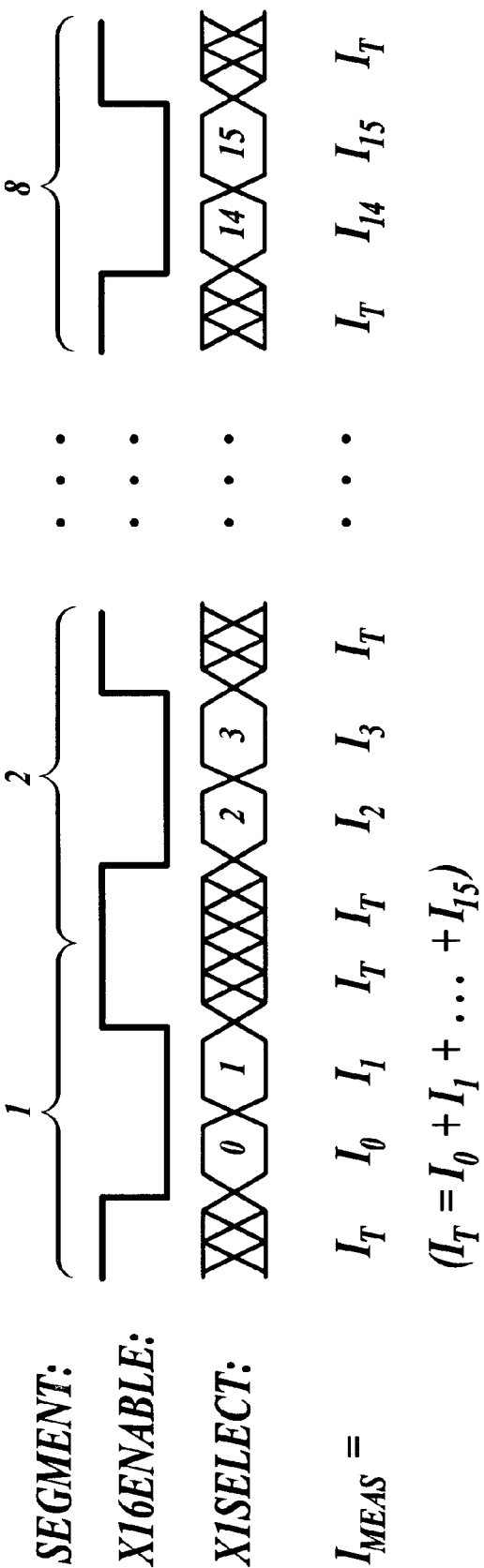
FIG. 4 is a graph illustrating the function of two control signals of an example embodiment for providing two different current densities in accordance with the present invention.

FIG. 4 is a graph illustrating the function of two control signals of an example embodiment for providing two different current densities in accordance with the present invention. The operation of the X16Enable and X1Select signals is shown over a period of eight segments of time. The X16Enable and X1Select signals are arranged to selectively control 16 individual current sources. For example, when X16Enable is high, a 16X current is applied to the remote sensor diode (120) by enabling all 16 current sources simultaneously (regardless of the state of X1Select). When X16Enable is low, the X1Select signal provides a 4-bit control number (or alternatively 16 control lines or other suitable encoding) that is used to activate a selected one of the 16 current sources such that a 1X bias current from the selected current source is provided to the remote sensor diode (120).

During each of the eight times segments illustrated in FIG. 4, a first sequence and a second sequence of current densities are applied to the remote sensor diode (120). During the first sequence of each segment the current densities 16X and 1X are applied in order to the remote sensor diode (120). During the second sequence the current densities 1X and 16X are respectively applied to the remote sensor diode (120). Alternatively, other patterns may be applied. For example, a first sequence may include the pattern "16X 1X 1X" and a second sequence may include the pattern "1X 1X 16X." Also, a random or pseudorandom pattern can be applied. A pseudorandom sequence typically contains an even distribution of currents of each density. A substantially even distribution of currents is within 80 percent of an even distribution of currents.

In the first time segment, the current density 16X is initially applied to the remote sensor (X16Enable is activated). The value of X1Select determines which of the current sources will be activated to supply a 1X current density when X16Enable transitions to an inactive state. For example, a value of "0" for X1Select is used to select the first current source ($I_0$). Thus, $I_{MEAS}$ (which is the current applied to the remote sensor) is equal to $I_T$ (which is the 16X current density) and $I_0$ (which is a 1X current density derived from the first current source) for the first sequence of the first time segment.

During the second half of each segment, the second sequence is applied. Here, X1Select corresponds to a value of "1" and the second current source ($I_1$) with a current density of 1X is selected. When X16Enable becomes active at the end of the segment, all current sources are activated again so that a current density of 16X is applied. Thus, $I_{MEAS}$ is equal to $I_1$ (which is a 1X current density derived from the second current source) and $I_T$ for the second sequence of the first segment. In this example, X1Select is incremented each time a 1X current density is applied so that all 16 current sources are individually applied within the space of eight time segments. Applying the 16 current sources individually allows the effects of mismatched individual current sources to be minimized by averaging the voltages that are produced across the PN junction by the mismatched individual current sources over time.

Figure 5:
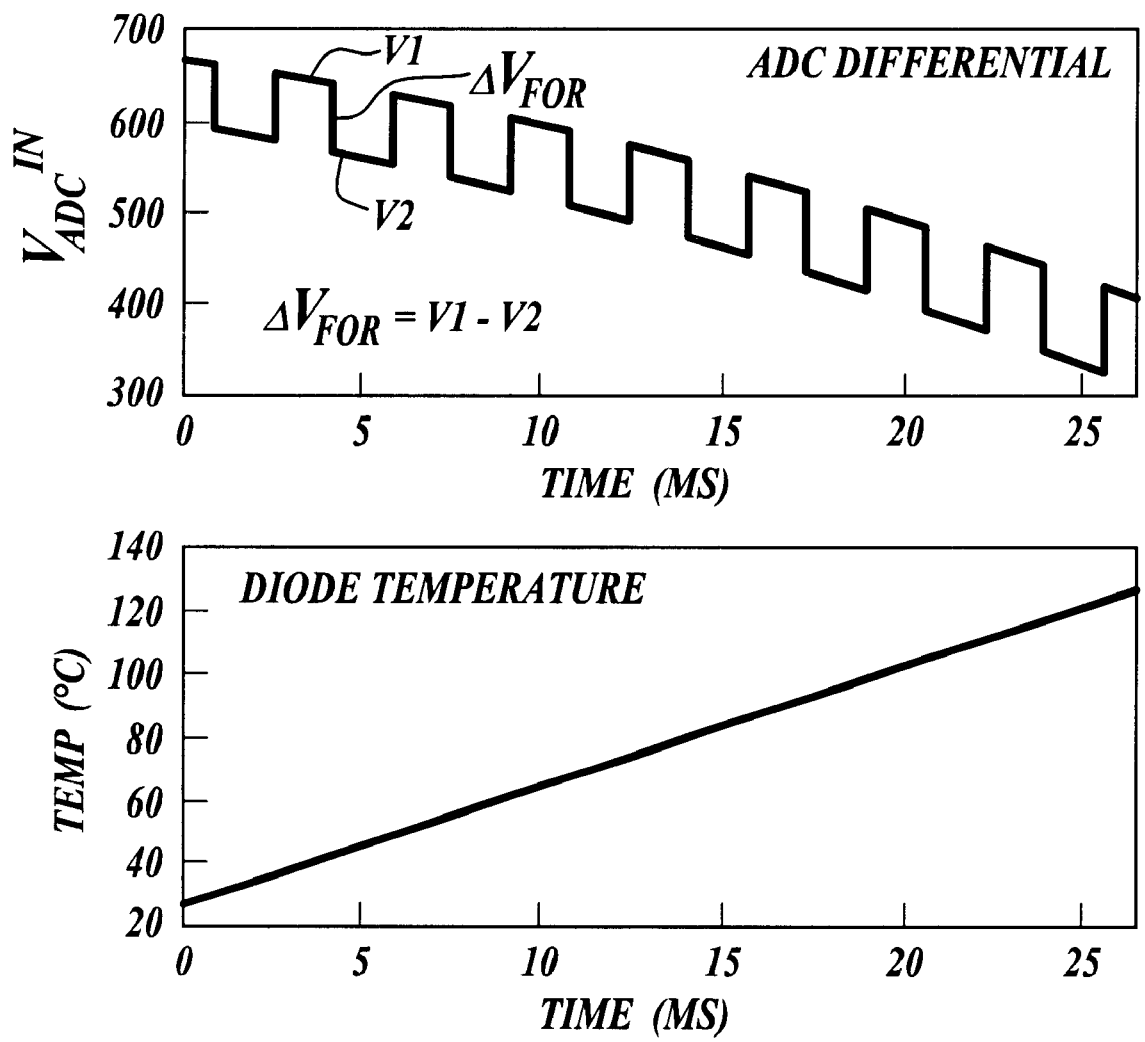
FIG. 5 is a graph illustrating an exemplary voltage potential produced across a PN junction of a remote temperature sensor as a function of the temperature of the junction and the current density applied to the junction in accordance with the present invention.

FIG. 5 is a graph illustrating an exemplary voltage produced across a PN junction in a remote sensor (120) as a function of the PN junction temperature and applied current. The graph illustrates generally that the voltage produced across the PN junction in the remote sensor (120) decreases in response to a rise in PN junction temperature. The "square wave" appearance of the voltage signal produced across the PN junction in the remote sensor (120) is the result of applying alternating current densities to the PN junction. For example, a 16X current produces a higher voltage (V1), while a 1X current produces a lower voltage (V2). The combined result of the change in temperature and the alternating current densities produces a change in the height of the "square wave" (i.e. produces a change in $\Delta V_{for}$ as described above with reference to Formula 1). The ratio of applied current densities (16X, here) and the measured voltages can be used to calculate the temperature of the PN junction as previously described.

Figure 6:
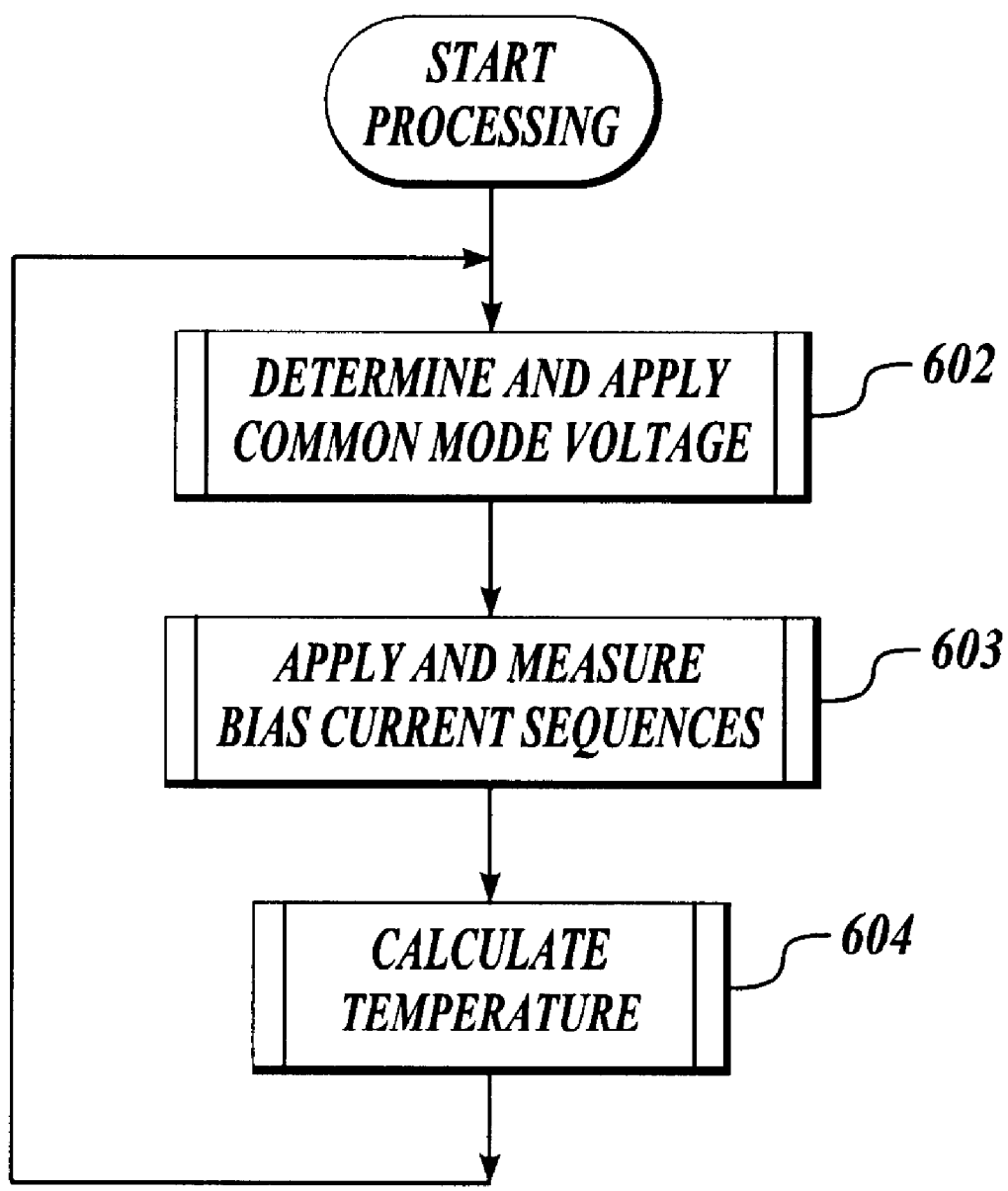
FIG. 6 is a flow diagram of an example method using a sub-ranging analog-to-digital converter to accurately measure a forward-biased PN junction of a temperature sensor in accordance with the present invention.

FIG. 6 is a flow diagram of an example method using a sub-ranging analog-to-digital converter to accurately measure a voltage from a temperature sensor in accordance with the present invention. Processing begins at block 602 (determined and apply intermediate voltage) where a first bias current is applied to the remote sensor. The response voltage from the temperature sensor is measured and used as a guideline for selecting and applying an intermediate voltage. The intermediate and common-mode voltages are determined and applied to subsequent responsive voltages from the temperature sensor. Processing proceeds from block 602 to block 604. In block 604 (apply and measure bias current sequences), bias currents are applied to the PN junction and the responsive voltages are measured. Processing proceeds from block 604 to block 606. In block 606 (calculate temperature), the measured response voltages from block 602 and block 604 are used to produce a numeric index that indicates the measured temperature in the remote sensor. Block 602 may be optionally executed as necessary to recalibrate the intermediate voltage. The method according to FIG. 6 may be repeated as necessary to determine temperature.

The determine and apply intermediate voltage routine (block 602) is described below with reference to FIG. 7. The apply and measure bias current sequences routine (block 604) is described below with reference to FIG. 8. The calculate temperature routine (block 606) is described below with reference to FIG. 9.

Figure 7:
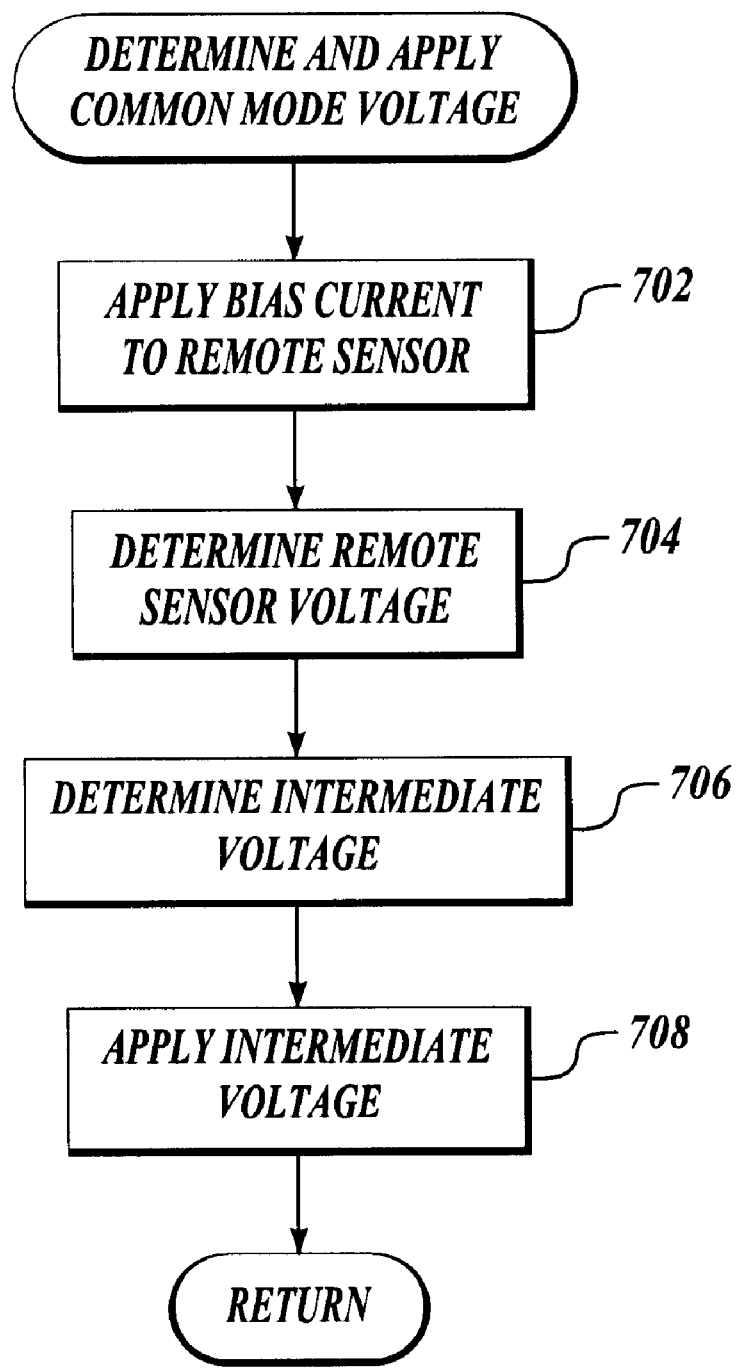
FIG. 7 is a flow diagram illustrating the method for determining an intermediate voltage to offset the response of a remote sensor (120) in accordance with the present invention.

FIG. 7 is a flow diagram illustrating the method for determining an intermediate voltage to offset the response voltage from a remote sensor (120) in accordance with the present invention. Beginning at block 702 (apply bias current to remote sensor), a larger of two bias currents is applied to the remote sensor (120). Processing continues at block 704 (determined remote sensor voltage) where digital codes are iteratively applied to the DAC (124) to determine the remote sensor voltage. Proceeding to block 706 (determine intermediate voltage), the intermediate voltage (or offset voltage for processing measurements) is determined from the digital code from block 704. The intermediate voltage corresponds to the output voltage of the DAC (124) that is at least one LSB below the conversion code for the DAC (124) when the response voltage from the remote sensor (120) is biased with the larger bias current. The intermediate voltage is also greater than the expected response voltage from the remote sensor (120) when biased with the smaller bias current. Proceeding from block 706 to block 708 (apply intermediate voltage), the intermediate voltage is applied to the inverting input of the summer (128) so that the intermediate voltage is subtracted from the response voltages from the remote sensor (120). The response voltages may be optionally filtered to remove system noise as described above with reference to FIG. 3. Proceeding from block 708 to block 710, processing is terminated.

Figure 8:
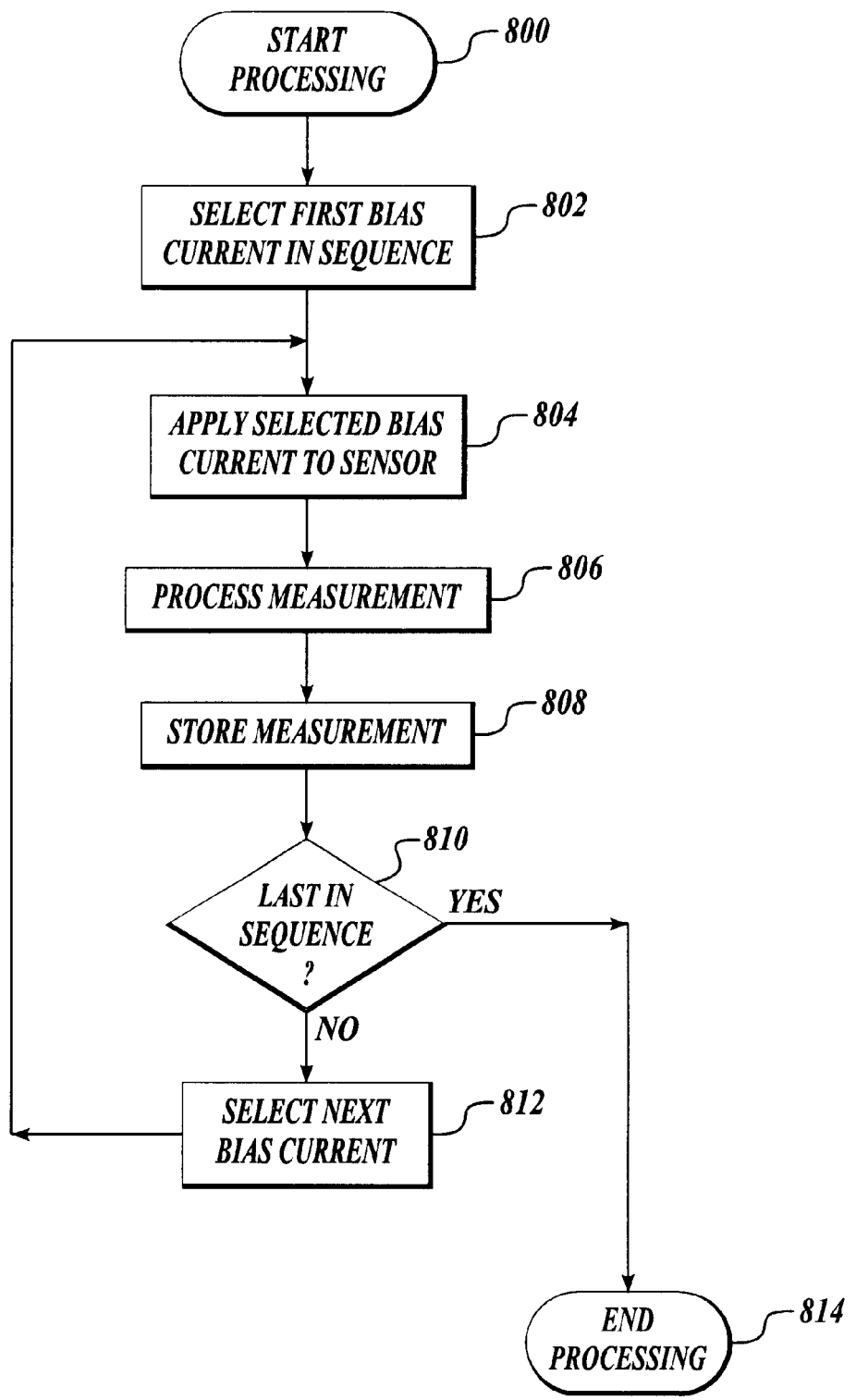
FIG. 8 is a flow diagram illustrating a method for applying a sequence of bias currents and measuring a resulting potential on a remote temperature sensor in accordance with the present invention.

FIG. 8 is a flow diagram illustrating a method for applying a sequence of bias currents and measuring a resulting potential on a sensor (120) (i.e., a PN junction). Beginning at block 802 (select first bias current in sequence), the first bias current in the sequence is selected. Processing continues at block 804 (apply selected bias current to sensor) where the selected current is applied to the sensor (120). Proceeding to block 806 (process measurement), the voltage across the remote sensor (120) is sampled while the selected current is applied to the sensor (120). Proceeding from block 806 to block 808 (store measurement), the sample obtained from the ADC (114) is stored in the temperature log (118) or some other suitable memory device. Processing continues at decision block 810 (last in sequence?), where the currently selected bias current is evaluated to determine if it is the last bias current in the sequence. When the currently selected bias current is not the last one in the sequence, processing continues to block 812. At block 812 (select next bias current), the next bias current in the sequence is selected and processing flows to block 804. Returning to decision block 810, processing flows to block 814 (END) when the last bias current in the sequence has been used. At block 814, processing is terminated.

Multiple bias current sequences can be processed using the procedures illustrated in FIG. 8. In an example embodiment, a second sequence is the same as the first sequence, except that the second sequence is in a reverse order with respect to the first sequence. Either the last bias current of the first sequence or the first bias current of the second sequence may be omitted if the last bias current of the first sequence is the same as the first of bias current of the second sequence. The results of the non-omitted bias current may be used in place of the omitted bias current for purposes of calculating the temperature of the PN junction in the remote sensor (120).

Figure 9:
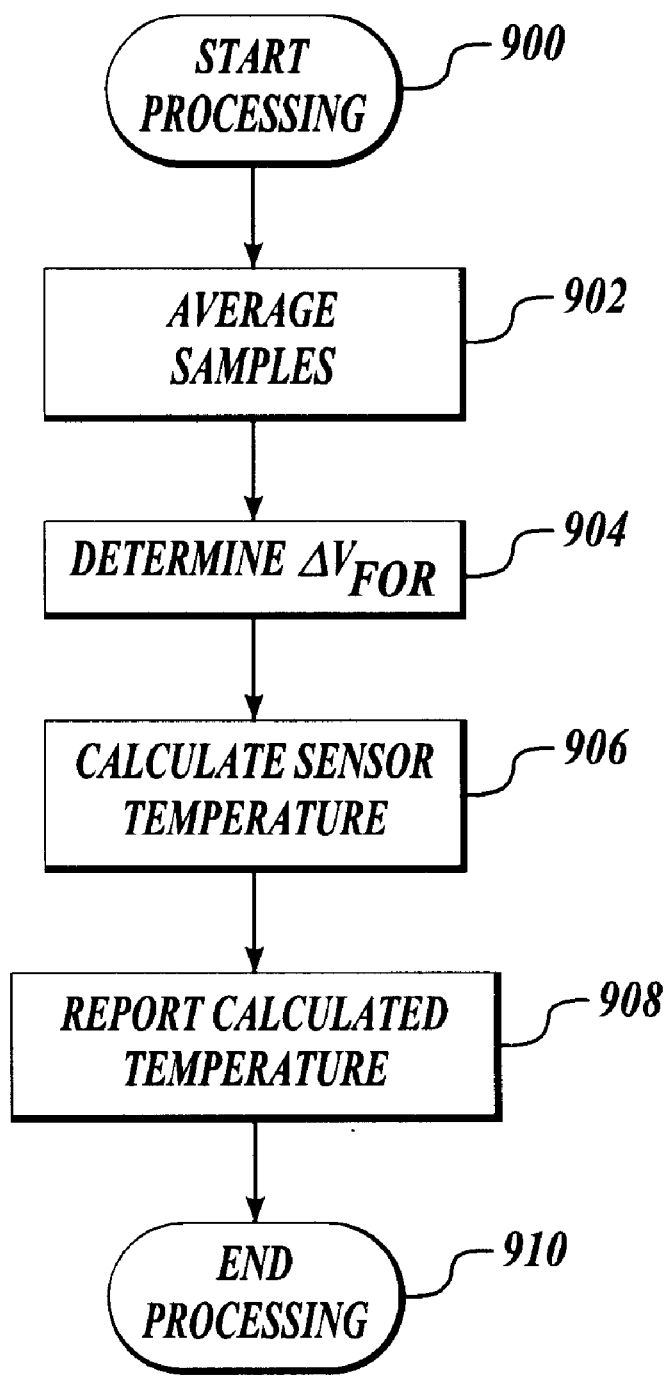
FIG. 9 is a flow diagram illustrating a method for calculating a temperature for the PN junction of a remote sensor in accordance with the present invention.

FIG. 9 is a flow diagram illustrating a method for calculating a temperature in a sensor (120) in accordance with the present invention. Beginning at block 902 (average samples), a numeric average for the samples from each bias current in a segment of time is determined. The averages correspond to an average response voltage when the higher (or larger) bias current is applied to the sensor, and another average for the response voltage when the lower (or smaller) bias current is applied to the sensor. Processing continues at block 904 (determine $\Delta V_{for}$), where $\Delta V_{for}$ is determined by calculating the difference between the average response voltage from the higher bias current from the average response voltage from the lower bias current. Proceeding from block 904 to block 906 (calculate remote sensor temperature) the temperature for the sensor (120) is calculated using equation (I), described above. Proceeding from block 906 to block 908 (report calculated temperature), the calculated temperature is reported to another system or optionally stored in the temperature log (118) for further dissemination. Proceeding from block 908 to block 910, processing is terminated.

In one embodiment, the samples utilized in block 902 correspond to samples from a sequence of time-interleaved currents. For example, all samples associated with a 16X current that were made during a temperature measurement period are averaged together, and all samples associated with a 1X current that were made during the temperature measurement period are averaged together. In another embodiment, the samples may correspond to an oversampling of the response voltage from the remote sensor (120). Alternatively, the samples may also correspond to samples that are made when different current sources that have the same current density are applied in a sequence.

Certain calculations required by formula (I) may be calculated in advance in order to facilitate fast temperature calculations at runtime. For example, factors that remain constant may be calculated in advance for later use. In another example, constant factors that merely "scale" the resulting temperature may be left out of the calculation. Additionally, lookup tables can be used to perform calculations or determine various actions to be taken.

The determined sensor temperature from block 906 can be used for various purposes including instrumentation, control of a process for making articles of manufacture, monitoring the temperature of a processor, changing clock speeds of a processor, shutting down parts of a circuit to allow for cooling and power conservation, and the like.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of sampling a response voltage from a temperature sensor that includes a PN junction, the method comprising:

generating an offset voltage in response to a digital code;

applying a first bias current to the temperature sensor such that the PN junction produces a first PN junction voltage, and the temperature sensor produces a first response voltage;

combining the offset voltage and the first response voltage to produce a first signal;

applying a second bias current to the temperature sensor such that the PN junction produces a second PN junction voltage, and the temperature sensor produces a second response voltage, wherein the second bias current is different than the first bias current;

combining the offset voltage with the second response voltage to produce a second signal; and converting the first and second signals to digital codes using a converter that has an input voltage range, wherein the range of response voltages for the temperature sensor is greater than the input voltage range of the converter.

2. The method of claim 1 wherein the offset voltage is within 72.5 mV of the first response voltage.

3. The method of claim 1 wherein the difference between the offset voltage and the first response voltage is between one and two quantization levels of the device used to generate the offset voltage.

4. The method of claim 1 wherein the digital code is determined by sampling the first response voltage, applying a digital code to a digital-to-analog converter, comparing an output voltage from the digital-to-analog converter to the first response voltage, and changing the digital code until a conversion is achieved.

5. The method of claim 1 wherein the digital code is determined by sampling the first response voltage, sampling the second response voltage, averaging the samples of the first and second response voltages to produce a sample average, and using a value of the sample average as the digital code.

6. The method of claim 1 wherein the first bias current is greater than the second bias current.

7. The method of claim 6 wherein the offset voltage is less than the first response voltage.

8. The method of claim 6 wherein the offset voltage is greater than the second response voltage.

9. The method of claim 6 wherein the offset voltage is less than the second response voltage.

10. The method of claim 6 wherein the offset voltage is greater than the first response voltage.

11. The method of claim 1 wherein the first bias current is an integer multiple of the second bias current.

12. The method of claim 1 further comprising the step of applying a low-pass filter to the first and second response voltages.

13. The method of claim 1 further comprising the step of calculating a temperature value using the digital codes that are associated with the first and second signals.

14. An apparatus for sampling response voltages from a temperature sensor that includes a PN junction, comprising:

a means for generating an offset voltage in response to a digital code;

a means for applying a first bias current that is arranged to apply a first bias current to the PN junction such that the PN junction produces a first PN junction voltage, and the temperature sensor produces a first response voltage;

a means for combining the offset voltage that is arranged to combine the first response voltage with the offset voltage to produce a first signal;

a means for applying a second bias current that is arranged to apply a second bias current to the PN junction such that the PN junction produces a second PN junction voltage, and the temperature sensor produces a second response voltage, wherein the first bias current is different from the second bias current; and a means for converting that is arranged to convert the first and second signals to digital codes, wherein the means for converting has an input voltage range that is less than a range of response voltages associated with the temperature sensor.

15. The apparatus of claim 14, wherein the difference between the offset voltage and the first response voltage is within at least one quantization levels of the device used to generate the offset voltage.

16. The apparatus of claim 14, further comprising a means for filtering that is arranged to provide low pass filtering to the first and second response voltages.

17. The apparatus of claim 14, further comprising means for calculating a temperature value using the digital codes that are associated with the first and second signals.

18. An apparatus for sampling response voltages from a temperature sensor that includes a PN junction, comprising:

a programmable current source that is configured to provide one of a first and second currents when selected to the temperature sensor such that the response voltage from the temperature sensor corresponds to a first voltage when the first current is selected and the response voltage corresponds to a second voltage when the second current is selected;

a controller that is configured to select the first and second currents;

an intermediate voltage selector that is configured to provide an offset voltage during a measurement mode;

a summer that is configured to receive the response voltage and the offset voltage, and provide an offset response voltage by subtracting the offset voltage from the response voltage; and an analog-to-digital converter that is configured to convert the offset response voltage into a digital code during a measurement mode, wherein the analog-to-digital converter has an input voltage range that is less than a range of response voltages associated with the temperature sensor.

19. The apparatus of claim 18, the intermediate voltage selector further comprising:

a digital-to-analog converter that is arranged to produce the offset voltage in response to a DAC code that is received from the controller during a pre-measurement mode; and a comparator that is arranged to compare the offset voltage to the response voltage such that the digital-to-analog converter and the comparator cooperate with the controller to operate as an analog-to-digital converter during the pre-measurement mode.

20. The apparatus of claim 18, further comprising a temperature calculator that is configured to calculate a temperature value from digital codes that are received from the analog-to-digital converter.

21. The apparatus of claim 18, wherein the controller is arranged to selectively activate the programmable current source such that the programmable current source applies a multiplicity of the first and second currents in a sequence during the measurement mode.

22. The apparatus of claim 18, wherein the sequence is one of a random sequence, a pseudo-random sequence, a regular sequence followed by a reverse sequence, and an over-sampling sequence.

* * * * *